Nov. 26, 1935.  C. W. RYERSON  2,021,965
TIRE COVER
Filed Aug. 1, 1933
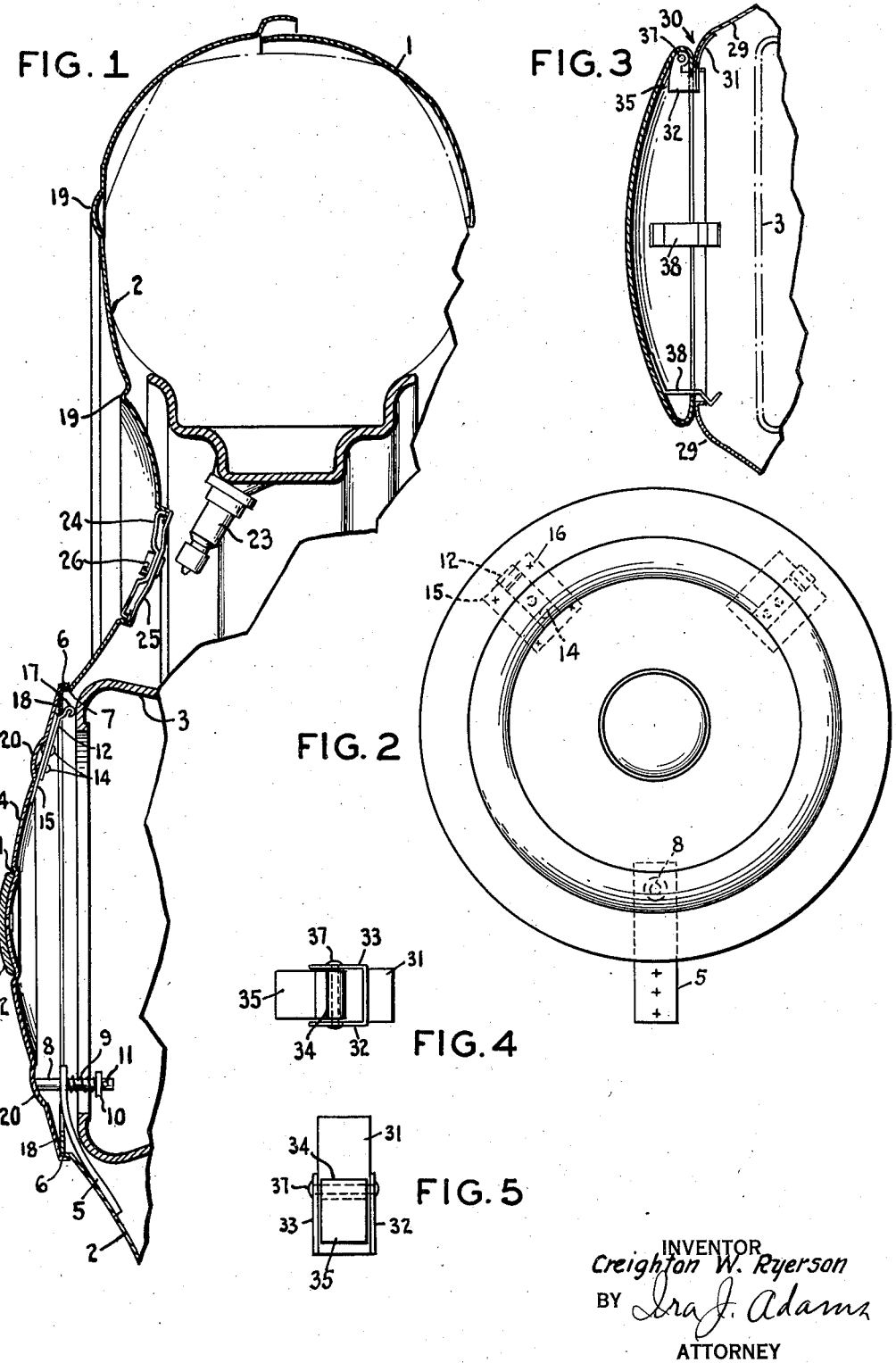
INVENTOR
Creighton W. Ryerson
BY Ira J. Adams
ATTORNEY Patented Nov. 26, 1935

2,021,965

UNITED STATES PATENT OFFICE 2,021,965

TIRE COVER

Creighton W. Ryerson, Jackson, Mich., assignor to Ryerson & Haynes Inc., a corporation of Michigan Application August 1, 1933, Serial No. 683,192

3 Claims. (Cl. 150—54)

This application relates to tire covers and an object of the invention is to provide at the center a hinged lid or closure that is neat in appearance, and effective in operation, but of minimum cost.

Other objects will appear in the following specification, reference being had to the drawing, in which:

Fig. 1 is a section of the tire cover, and a portion, only, of the wheel, the tire being shown in outline.

Fig. 2 is an elevation of the lid shown in Fig. 1.

Fig. 3 is a section of a modification.

Fig. 4 is a plan view of the hinge shown in Fig. 3.

Fig. 5 is an end elevation of the hinge of Fig. 3.

Referring particularly to Fig. 1, the tire cover consists of a back ring 1 on the side of the tire next to the body of the automobile and a front plate or disc 2 covering the side and a portion of the tread of a spare tire. The back ring and tire may be fastened together by any desired means (not shown), for example, the clasp arrangement described in my copending application filed December 31, 1931, Serial No. 584,030. The spare wheel, the hub 3 only of which is shown, is fastened to the automobile in any desired way. No extra hub cap is necessary in my improved cover as a central lid 4 is pivoted to the front plate 2 to permit access to the hub fastening means with the cover in place on the spare tire. A hinge strap 5 is secured, for example, by spot welding to the front plate 2 and curved toward the center of the opening therein, as shown. The lid 4 is circular in form, as shown in Fig. 2 and has a slight flange 6 that fits over the bead 7 formed in plate 2. A hinge pin 8 is welded, riveted or otherwise secured to the lid 4 and extends somewhat loosely through the hinge strap 5. A spring 9 surrounds this hinge pin, one end abutting against the strap 5 and the other against a washer 10 held on the pin by a cotter pin 11 or other arrangement. When the lid 4 is in place, as shown in Fig. 1, this spring resiliently holds it centered on the bead 7. This action is also aided by one or more snap catches 12, two only being shown in Fig. 2. These catches may be riveted or otherwise fastened at 14 to a bar 15 which may be spot welded at 16 to the front plate 2. The catches may have rounded ends 17, as shown, to snap under the depending portion 18 of the plate 2. The spring action of these catches taken with that of the hinge pin 8, firmly and resiliently holds the lid in position.

When it is desired to remove the wheel from its mounting (not shown) the lid 4 may be opened by grasping the edge 6 adjacent the catches 12 and pulling outwardly. This will cause the lower part of the bead 6 in Fig. 1 to serve as a fulcrum to compress the hinge spring 9 while tilting and sliding the hinge pin in strap 5. As soon as the catch or catches are freed from the depending rim or flange 6 of the disc the lid may be rotated around the center of hinge pin 11. The fastening means of the mounting bracket (not shown) are thus exposed and can be disengaged with appropriate tools.

This arrangement securely mounts the lid in position on the cover and it cannot be lost when changing wheels. The spring action of the hinge and catch is such that all rattle is eliminated when the car is in motion.

As will be seen, I have shown a plurality of integral beads 19 in the tire cover to improve the appearance, and also a bead 20 in the lid. This latter bead also gives clearance for the rivets 14 of the catch member. It is also convenient to weld or otherwise secure the hinge pin 11 in this bead 20. The beads may be burnished, painted, plated or otherwise decorated as desired. The beads may also be separate parts attached to the face plate by any known means, for example, as shown in my copending case referred to.

A center depression 21 in the lid 4 permits the mounting of the emblem of the automobile manufacturer as at 52. To enable one to have access to the stem 23 of Fig. 1 an oval lid or closure 24 fits into a similarly shaped opening in the front plate 2. A strap 25 holds this lid in place by extending across the minor axis of the oval and contacting with the inside of the front plate. This lid may be removed by inserting a screw driver in the screw 26 and rotating the strap 25 90° parallel to the long axis of the oval.

In Figure 3 the center lid is hinged to the front plate or disc 29 at 30. The hinge consists of a strap 31 spot welded or otherwise fastened to the front plate. The lower part of this strap has integral ears 32, 33 (Figs. 4 and 5) receiving the curled end 34 of a strap 35 spot welded or otherwise secured to the lid. A hinge pin 37 passes through the ears 32, 33 and the curled end 34 to form the hinge.

In Fig. 3 I have indicated that three snaps 38 are used, two only being visible in this figure but only one, or any other desired number may be used.

Various other modifications may be made in the invention disclosed without departing from the spirit of the invention.

Having described my invention, what I claim is:

1. In a tire cover for a spare tire and wheel having a hub cap opening, a circular sheet metal member adapted to surround a portion of the tire, a metal disc attached to said circular member having a hole surrounded by an external bead opposite the hub cap opening, a lid having a flange and extending over said bead, a hinge pin attached to said lid and extending substantially at right angles to the plane of the lid and into said opening, means on said disc slidingly and rotatably engaging said pin and a spring acting on said pin for moving the lid to closing position with its flange fitting over said bead.

2. In a tire cover for a spare tire and wheel having a hub cap opening, a circular sheet metal member adapted to surround a portion of the tire, a metal disc attached to said circular member having a hole surrounded by an external bead opposite the hub cap opening, a lid having a flange and extending over said hole, a hinge strap attached to said disc and extending adjacent said hole, a hinge pin attached at one end to said lid and extending into said hub cap opening through said strap, a compression spring surrounding said pin and secured between the strap and the other end of said pin whereby the lid is resiliently held against the disc in closed position with the flange fitting over said bead, and means adjacent the edge of the disc for releasably holding the lid in said closed position.

3. In a tire cover for a spare tire and wheel having a hub cap opening, a circular sheet metal member adapted to surround a portion of the tire, a metal disc attached to said circular member having a hole surrounded by an external bead opposite the hub cap opening, a lid having a flange and extending over said hole, a hinge strap attached to said disc and extending adjacent said hole, a hinge pin attached at one end to said lid and extending into said hub cap opening through said strap, a compression spring surrounding said pin and secured between the strap and the other end of said pin whereby the lid is resiliently held against the disc in closed position with the flange fitting over said bead, and spaced catches attached to said lid and constituting with said pin a spaced three point support of the lid in position over the hole.

CREIGHTON W. RYERSON.